United States Patent
Zimmerman et al.

(10) Patent No.: US 8,547,456 B1
(45) Date of Patent: Oct. 1, 2013

(54) SYSTEM AND METHOD FOR MONITORING INACTIVE PIXELS IN A SCENE IMAGING SYSTEM

(75) Inventors: Kenneth A. Zimmerman, Sherwood, OR (US); Carlo L. Tiana, Portland, OR (US); Robert B. Wood, Beaverton, OR (US); Michael J. Oldham, Woodburn, OR (US); Robert A. Armstrong, Canby, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1036 days.

(21) Appl. No.: 12/569,999

(22) Filed: Sep. 30, 2009

(51) Int. Cl.
*H04N 9/64* (2006.01)
(52) U.S. Cl.
USPC .......................................... 348/247; 348/164
(58) Field of Classification Search
USPC ........................................ 348/164, 246, 247
See application file for complete search history.

(56) References Cited

U.S. PATENT DOCUMENTS

| | | | |
|---|---|---|---|
| 6,819,358 B1 * | 11/2004 | Kagle et al. | 348/246 |
| 7,016,550 B2 * | 3/2006 | Alderson et al. | 382/274 |
| 7,589,770 B2 * | 9/2009 | Chan | 348/246 |
| 8,149,305 B2 * | 4/2012 | Shin et al. | 348/246 |
| 2003/0151682 A1 * | 8/2003 | Kokubo et al. | 348/241 |
| 2004/0131231 A1 * | 7/2004 | Smilansky | 382/103 |
| 2008/0285845 A1 * | 11/2008 | Kang | 382/162 |

* cited by examiner

*Primary Examiner* — David Lazaro
(74) *Attorney, Agent, or Firm* — Donna P. Suchy; Daniel M. Barbieri

(57) ABSTRACT

A method for monitoring inactive pixels in a scene imaging system may include determining a location of at least one inactive pixel in a focal plane array. The method may include sensing an environment image based upon a surrounding environment of an aircraft. The method may include generating an image associated with the environment image. The method may include evaluating a location for one or more inactive pixels in the generated image in comparison to a location for the at least one inactive pixel in the focal plane array. The method may include determining whether a fault exists in image generation or image display based upon the evaluation.

20 Claims, 7 Drawing Sheets

US 8,547,456 B1

SYSTEM AND METHOD FOR MONITORING INACTIVE PIXELS IN A SCENE IMAGING SYSTEM

TECHNICAL FIELD

The present disclosure relates to scene imaging systems and more particularly to a system and method for determining the accuracy of an image presented in a scene imaging system by monitoring the inactive pixels of the scene imaging system.

BACKGROUND

Many devices, such as aircraft, are typically designed to provide a real-world view of the out-the-window scene for at least one operator to operate the device. In the past, a view of the scenery outside the device was provided through passive means, such as a cockpit windshield, or artificial means through sensors and displays.

Enhanced Vision Systems (EVS) supplement out-the-window vision via the use of camera/sensor imagery superimposed over real-world, or synthetic, imagery. However, these cameras/sensors may include inactive or dead pixels as a result of the camera's/sensor's production process.

SUMMARY

A system for monitoring inactive pixels in a scene imaging system may include an imaging sensor. The imaging sensor may be configured to sense an environment image. The imaging sensor may generate an image associated with the environment image. The imaging sensor may include a focal plane array. The focal plane array may include at least one inactive pixel. The system may include an imaging system processor. The imaging system processor may be operatively connected or coupled to the imaging sensor. The imaging system processor may process the generated image and determine whether a fault exists in image generation or image display. The imaging system processor may determine whether a fault exists by evaluating the location for one or more inactive pixels in the generated image in comparison to the known location for the at least one inactive pixel in the focal plane array. The system may include an imaging system display. The imaging system display may be operatively connected to the imaging processor. The imaging system display may display the generated image.

A system may further include an aircraft. An imaging sensor may be operatively connected or coupled to the aircraft. The imaging sensor may be configured to sense an environment image and generate an image associated with the environment image. The imaging sensor may include a focal plane array. The focal plane array may include at least one inactive pixel. The system may include an imaging system processor. The imaging system processor may be operatively connected or coupled to the imaging sensor. The imaging system processor may process the generated image and determine whether a fault exists in image generation or image display. The imaging system processor may determine whether a fault exists by evaluating the location for one or more inactive pixels in the generated image in comparison to the known location for the at least one inactive pixel in the focal plane array. The system may include an imaging system display. The imaging system display may be operatively connected to the imaging processor. The imaging system display may display the generated image.

A method for monitoring inactive pixels in a scene imaging system may include determining a location of at least one inactive pixel in a focal plane array. The method may include sensing an environment image based upon a surrounding environment of an aircraft. The method may include generating an image associated with the environment image. The method may include evaluating a location for one or more inactive pixels in the generated image in comparison to a location for the at least one inactive pixel in the focal plane array. The method may include determining whether a fault exists in image generation or image display based upon the evaluation.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Figure 1:
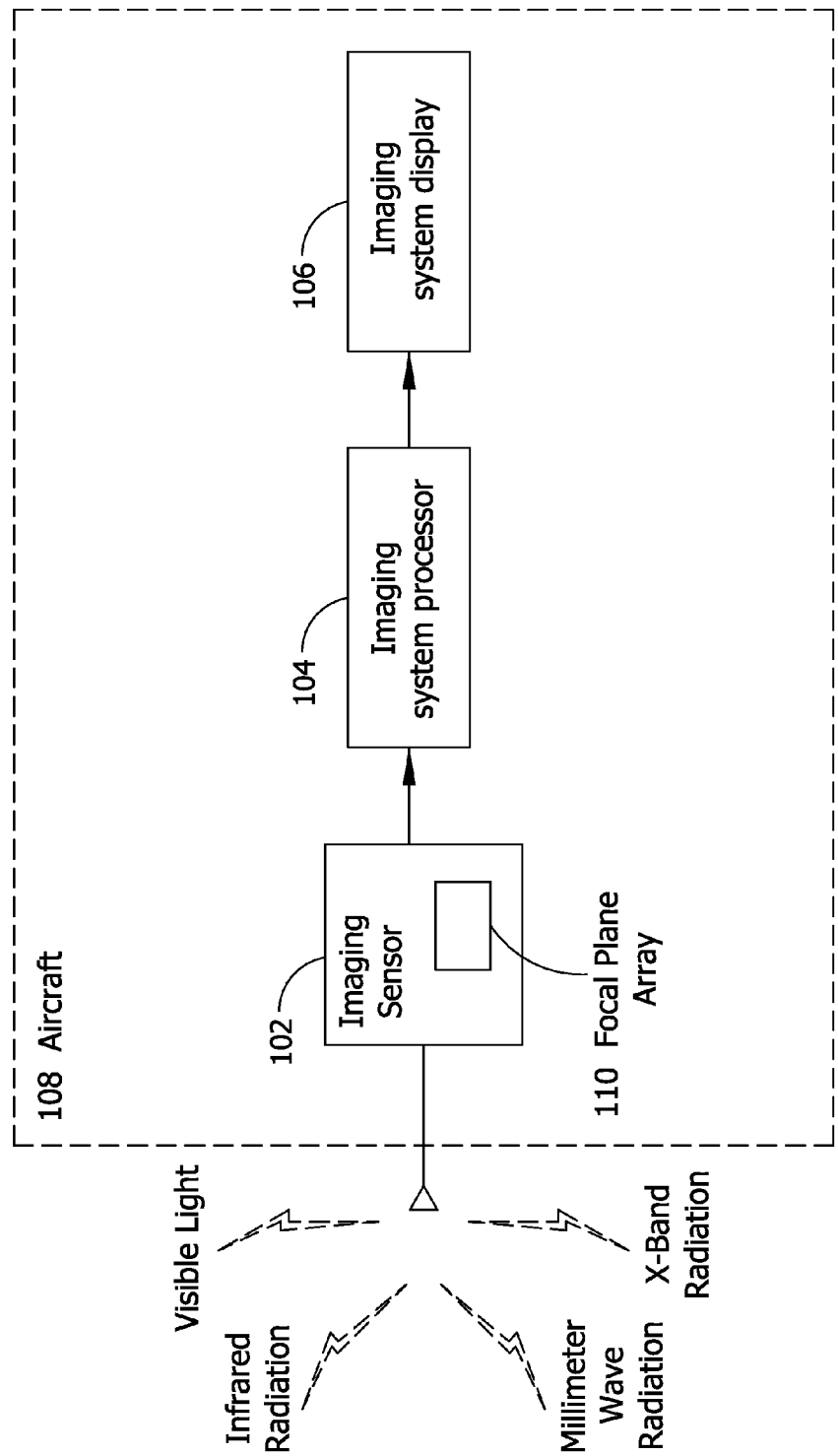
FIG. 1 is a block diagram illustrating a system for monitoring inactive pixels in a scene imaging system.

Reference will now be made in detail to the subject matter disclosed, which is illustrated in the accompanying drawings.

A system for monitoring inactive pixels in a scene imaging system 100 may include an imaging sensor 102. The imaging sensor 102 may be configured to sense an environment image. The imaging sensor 102 may generate an image associated with the environment image. The imaging sensor 102 may include a focal plane array 110. The imaging system's focal plane array may include at least one inactive pixel. The system 100 may include an imaging system processor 104. The imaging system processor 104 may be operatively connected or coupled to the imaging sensor 102. The imaging system processor 104 may process the generated image and determine whether a fault exists in image generation or image display. The imaging system processor 104 may determine whether a fault exists by evaluating a location for one or more inactive pixels in the generated image in comparison to a location for the at least one inactive pixel in the focal plane array 110. The system 100 may include an imaging system display 106. The imaging system display 106 may be operatively connected to the imaging processor 104. The imaging system display may display the generated image.

Referring to FIG. 1, a system for monitoring inactive pixels in a scene imaging system 100 is illustrated. A system 100 may include an imaging sensor 102. The imaging sensor 102 may be configured to sense an environment image. The environment image may include images of objects or data of the surrounding environment that pilots or operators would not normally be able to see when looking through the cockpit window of an aircraft. The imaging sensor 102 may sense these objects or data by utilizing visible light camera technology, infrared technology, millimeter wave radar technology, X-Band radar technology, and the like. The imaging sensor 102 may generate an image associated with the environment image. The imaging sensor 102 may include a focal plane array 110. An imaging sensor's focal plane array 110 may include at least one inactive pixel as a result of the focal plane array's 110 production process. The image received and generated by the imaging sensor 102 may include the inactive pixels. The generated image may be provided to the imaging system processor 104 for analysis. These inactive pixels may result naturally or may be purposely inactivated as part of the production process. A map or coordinate system of the known inactive pixels may be ingrained into the imaging sensor 102. These inactive pixels appear in the generated image as any other object of the normal scene would appear.

The system 100 may include an imaging system processor 104. The imaging system processor 104 may process the generated image. The imaging system processor 104 may determine whether a fault exists in the image generation or the image display. The imaging system processor 104 may make this determination by evaluating a location for one or more inactive pixels in the generated image in comparison to a location for the at least one inactive pixel in the focal plane array 110. The imaging system processor 104 may determine whether a fault exists by comparing the map or coordinate system of known inactive pixels to the inactive pixels in the generated image. The imaging processor 104 may determine a fault exists in the image generation or the image display if there is at least one inactive pixel location in the generated image that does not match a corresponding location in the known inactive pixel map.

The system 100 may include an imaging system display 106. The imaging system display 106 may receive the generated image from the imaging system processor 104 and display the generated image to at least one operator of the aircraft 108. It is contemplated that the imaging system display 106 may be a Head-up Guidance System.

It is contemplated that the system 100 may be operatively coupled or connected to an aircraft 108. The imaging sensor 102 may be located in an aircraft's 108 radome (e.g. nosecone) or under the aircraft's protective layer in the vicinity of the forward cockpit windows. The aircraft 108 may include a commercial aircraft, military aircraft, single-engine aircraft, twin-engine aircraft, and the like. It is further contemplated that the system 100 may be configured to monitor the inactive pixels of sensors associated with quality and process control applications.

It is contemplated that system 100 may be an Enhanced Vision System. Enhanced Vision Systems (EVS) include sensors that may detect and display images of objects that pilots would not normally be able to see when looking through the cockpit window of an aircraft. For example, EVS can present data from sensors that may penetrate low-visibility weather conditions and darkness, such as radar or forward-looking infrared (FLIR). The data presented from the sensors may be derived from the current environment. EVS may be used on both head-down and head-up displays. Other features such as navigation enhancements and proactive systems to avoid controlled flight into terrain and runway incursions may be integrated in EVS.

To achieve lower minima landing credit using an Infrared (IR) based EVS system, the integrity of both the IR sensor and display device (e.g., a Head-up Guidance System) must meet minimal integrity requirements based on the function being performed. To qualify for use during low visibility operations, the EVS Sensor and image fusion processor of the Head-up Guidance System computer must not have any failure modes that would result in a hazardous failure condition for the aircraft. One skilled in the art would recognize that the system 100 may determine if a fault exists in the image generation or the image display.

Figure 2:
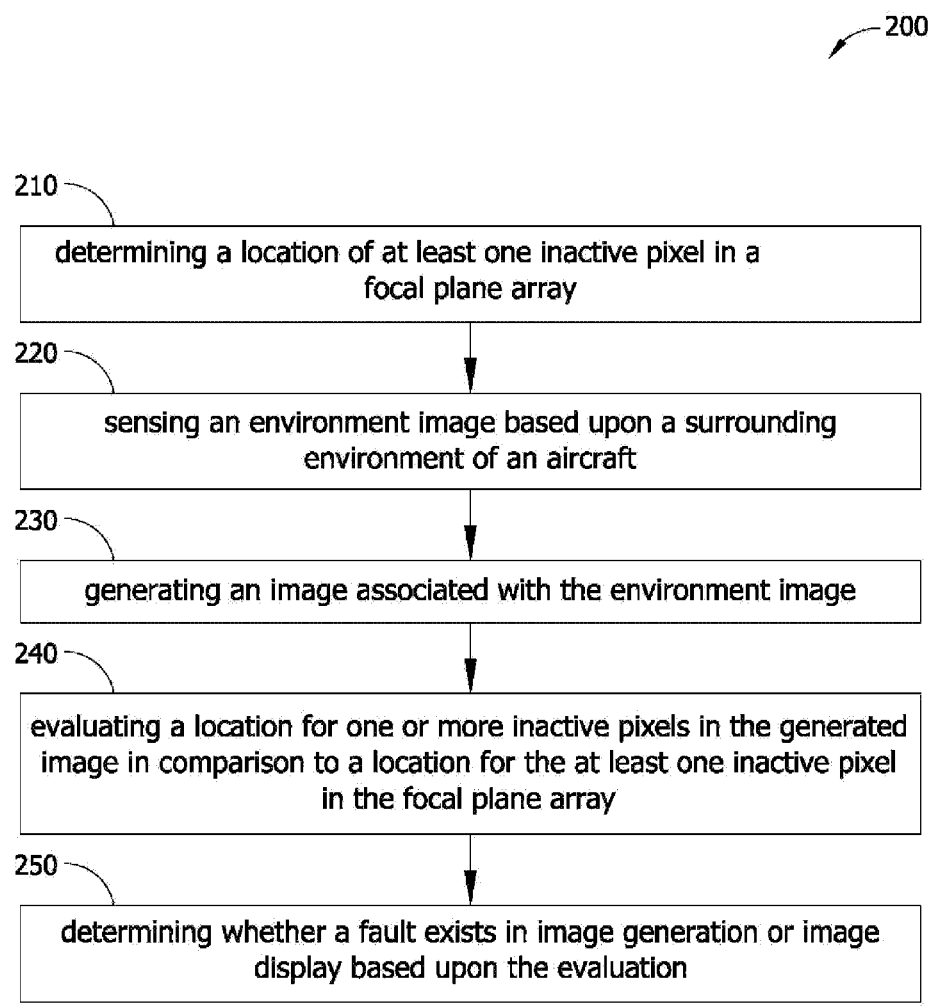
FIG. 2 is a flow diagram illustrating a method for monitoring inactive pixels in a scene imaging system.

Referring to FIG. 2, a method for monitoring inactive pixels in a scene imaging system 200 is illustrated. The method 200 may include determining a location of at least one inactive pixel in a focal plane array 210. The method 200 may include sensing an environment image based upon a surrounding environment of an aircraft 220. The method 200 may include sensing an environment image based upon a surrounding environment of an aircraft 230. The method 200 may include generating an image associated with the environment image 240. The method 200 may include evaluating a location for one or more inactive pixels in the generated image in comparison to a location for the at least one inactive pixel in the focal plane array 250. The method 200 may include determining whether a fault exists in image generation or image display based upon the evaluation 260.

Figure 3:
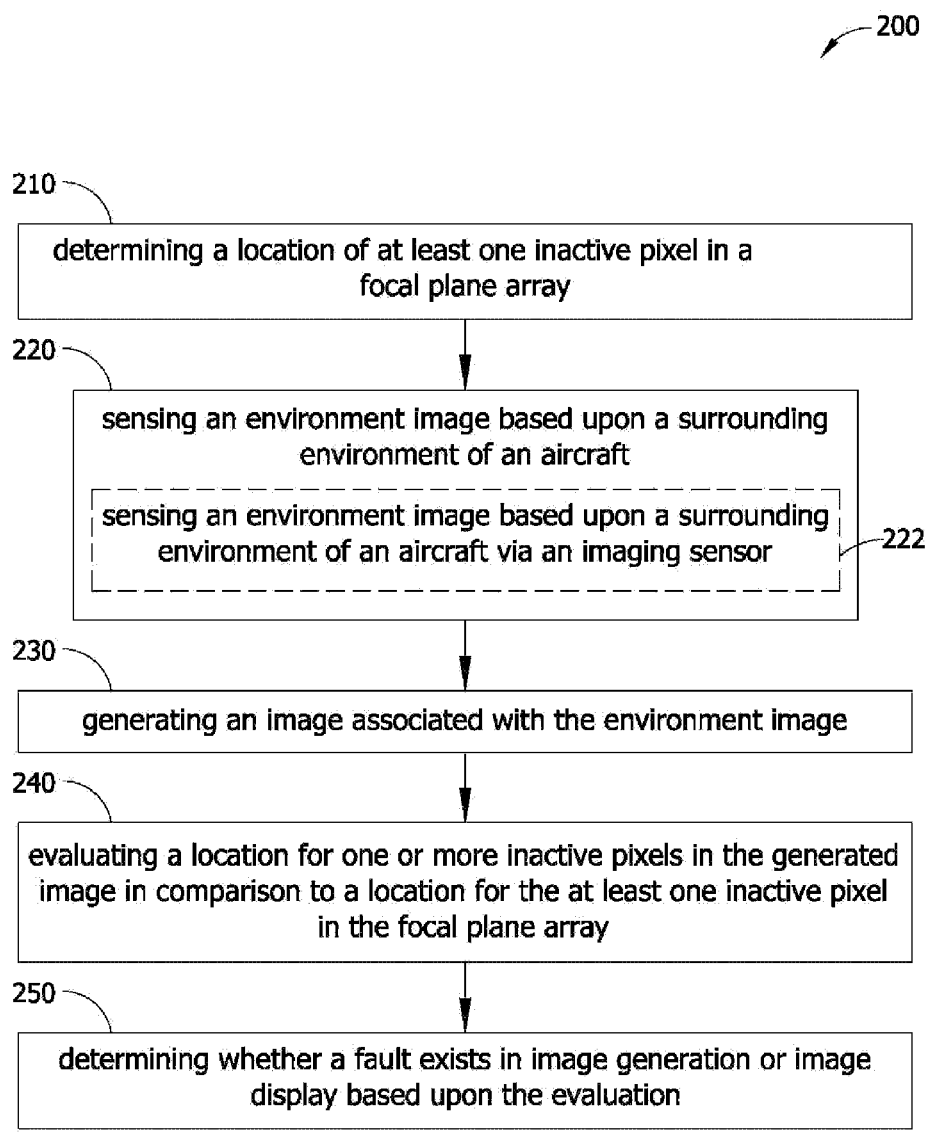
FIG. 3 is a flow diagram illustrating an alternative implementation of the method depicted in FIG. 2.

Referring to FIG. 3, the method 200 may further include sensing an environment image based upon a surrounding environment of an aircraft via an imaging sensor 222.

Figure 4:
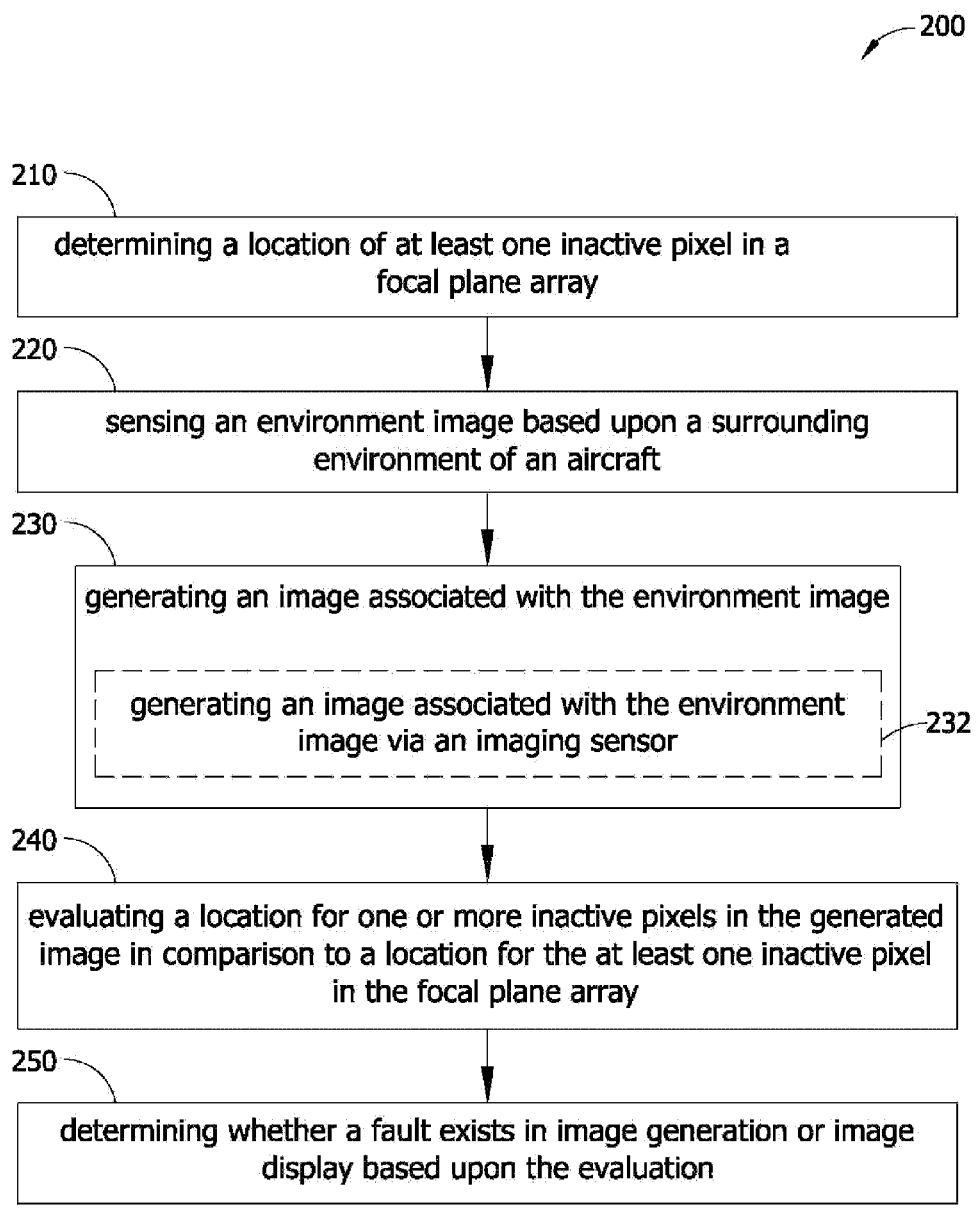
FIG. 4 is a flow diagram illustrating an alternative implementation of the method depicted in FIG. 2.

Referring to FIG. 4, the method 200 may further include generating an image associated with the environment image via an imaging sensor 232.

Figure 5:
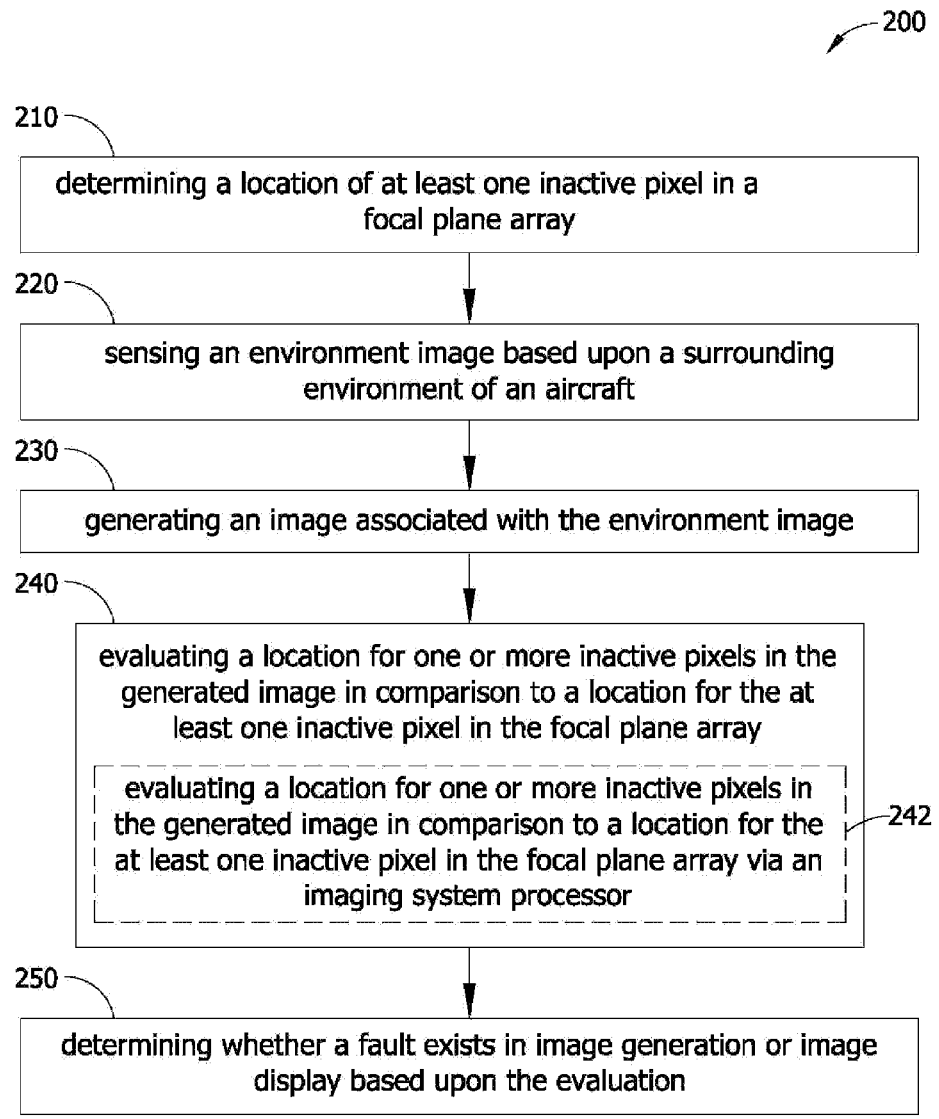
FIG. 5 is a flow diagram illustrating an alternative implementation of the method depicted in FIG. 2.

Referring to FIG. 5, the method 200 may further include evaluating a location for one or more inactive pixels in the generated image in comparison to a location for the at least one inactive pixel in the focal plane array via an imaging system processor 242.

Figure 6:
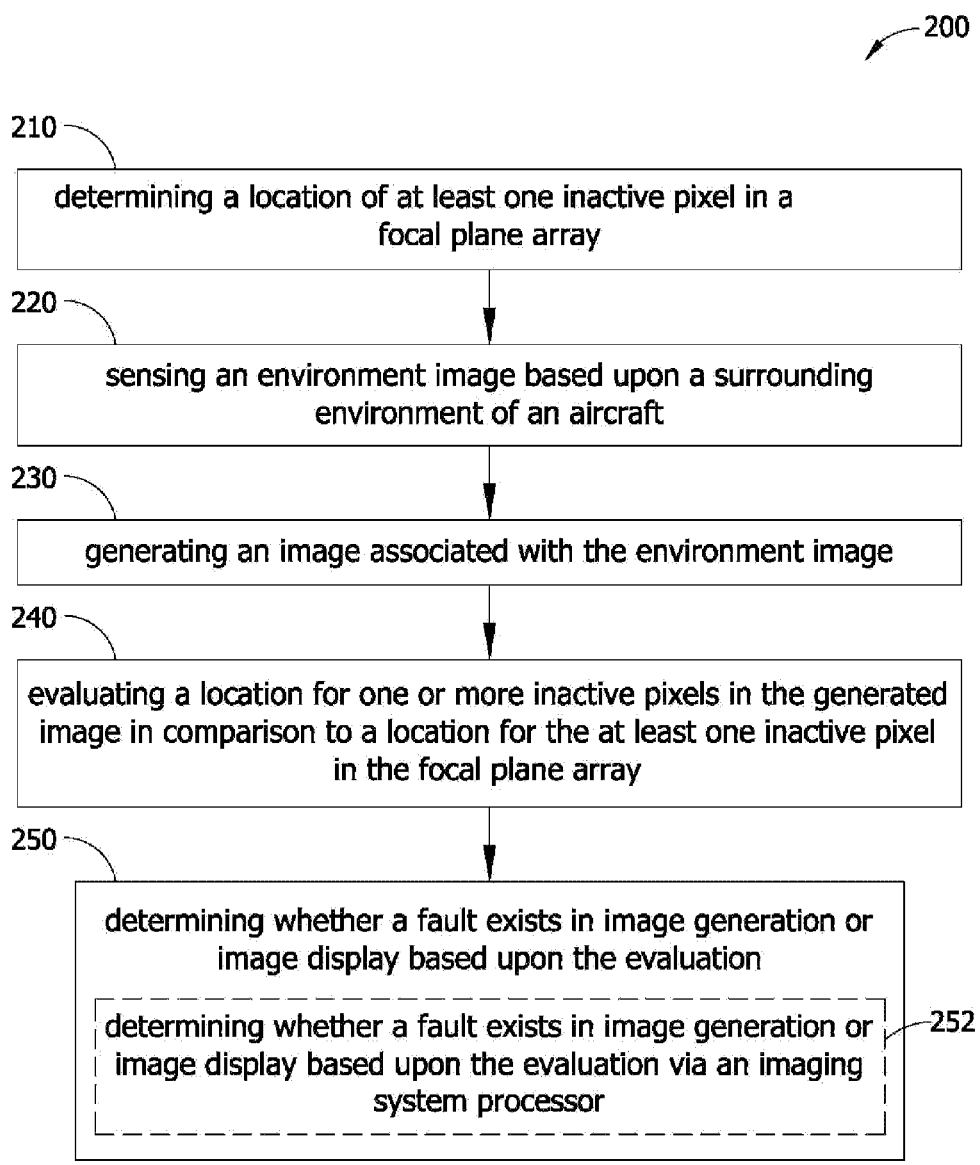
FIG. 6 is a flow diagram illustrating an alternative implementation of the method depicted in FIG. 2.

Referring to FIG. 6, the method 200 may further include determining whether a fault exists in image generation or image display based upon the evaluation via an imaging system processor 252.

Figure 7:
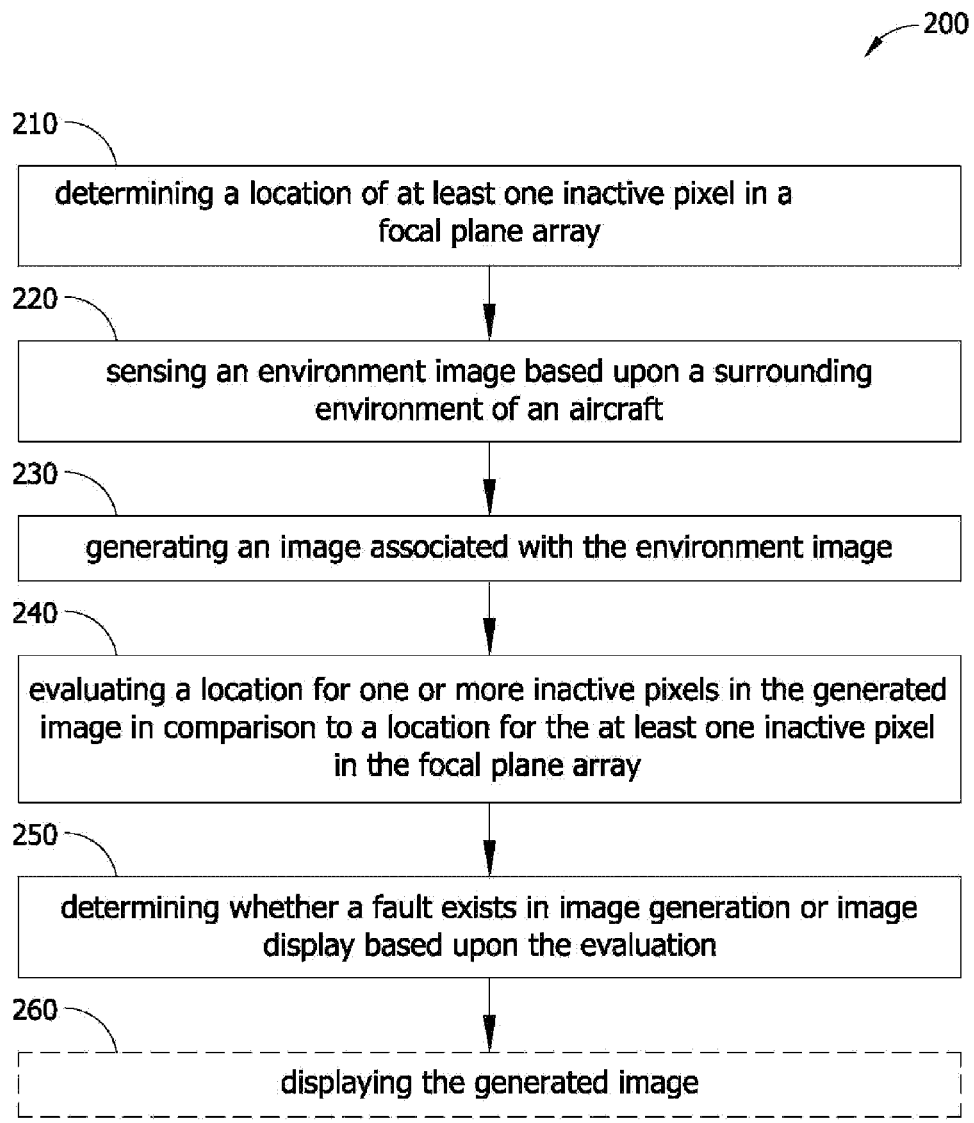
FIG. 7 is a flow diagram illustrating an alternative implementation of the method depicted in FIG. 2.

Referring to FIG. 7, the method 200 may further include displaying the generated image 260. The generated image may be displayed to at least one operator of the aircraft 108.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A system, comprising:
   an imaging sensor configured to sense an environment image and generating an image associated with the environment image, wherein the imaging sensor includes a focal plane array, the focal plane array including at least one inactive pixel;
   an imaging system processor operatively connected to the imaging sensor for processing the generated image and determining whether a fault exists in image generation or image display by evaluating a location for one or more inactive pixels in the generated image in comparison to a location for the at least one inactive pixel in the focal plane array; and an imaging system display operatively connected to the imaging system processor for displaying the generated image.

2. The system of claim 1, further comprising an enhanced vision sensor.

3. The system of claim 2, wherein the enhanced vision sensor includes an infrared detector.

4. The system of claim 2, wherein the enhanced vision sensor includes a visible light camera.

5. The system of claim 2, wherein the enhanced vision sensor includes an X-Band radar.

6. The system of claim 1, wherein the imaging system display includes a Head-up Guidance System.

7. The system of claim 1, wherein the imaging sensor is operatively connected to a quality control application.

8. A system, comprising;
an aircraft;
an imaging sensor operatively coupled to the aircraft, the imaging sensor configured to sense an environment image and generating an image associated with the environment image, wherein the imaging sensor includes a focal plane array, the focal plane array including at least one inactive pixel;
an imaging system processor operatively connected to the imaging sensor for processing the generated image and determining whether a fault exists in image generation or image display by evaluating a location for one or more inactive pixels in the generated image in comparison to a location for the at least one inactive pixel in the focal plane array; and
an imaging system display operatively connected to the imaging system processor for displaying the generated image.

9. The system of claim 8, further comprising an enhanced vision sensor.

10. The system of claim 9, wherein the enhanced vision sensor includes an infrared detector.

11. The system of claim 9, wherein the enhanced vision sensor includes a visible light camera.

12. The system of claim 9, wherein the enhanced vision sensor includes an X-Band radar.

13. The system of claim 8, wherein the imaging system display includes a Head-up Guidance System.

14. The system of claim 8, wherein the imaging sensor is located in a radome of the aircraft.

15. A method, comprising:
determining a location of at least one inactive pixel in an focal plane array;
sensing an environment image based upon a surrounding environment of an aircraft;
generating an image associated with the environment image;
evaluating a location for one or more inactive pixels in the generated image in comparison to a location for the at least one inactive pixel in the focal plane array; and
determining whether a fault exists in image generation or image display based upon the evaluation.

16. The method of claim 15, wherein sensing an environment image based upon a surrounding environment of an aircraft includes:
sensing an environment image based upon a surrounding environment of an aircraft via an imaging sensor.

17. The method of claim 15, wherein generating an image associated with the environment image includes:
generating an image associated with the environment image via an imaging sensor.

18. The method of claim 15, wherein evaluating a location for one or more inactive pixels in the generated image in comparison to a location for the at least one inactive pixel in the focal plane array includes:
evaluating a location for one or more inactive pixels in the generated image in comparison to a location for the at least one inactive pixel in the focal plane array via an imaging system processor.

19. The method of claim 15, wherein determining whether a fault exists in image generation or image display based upon the evaluation includes:
determining whether a fault exists in image generation or image display based upon the evaluation via an imaging system processor.

20. The method of claim 19, further comprising:
displaying the generated image.

* * * * *